June 30, 1931.  R. F. WHITTEMORE  1,811,988
HEADLIGHT
Filed July 23, 1928   2 Sheets-Sheet 1
Fig. 1.
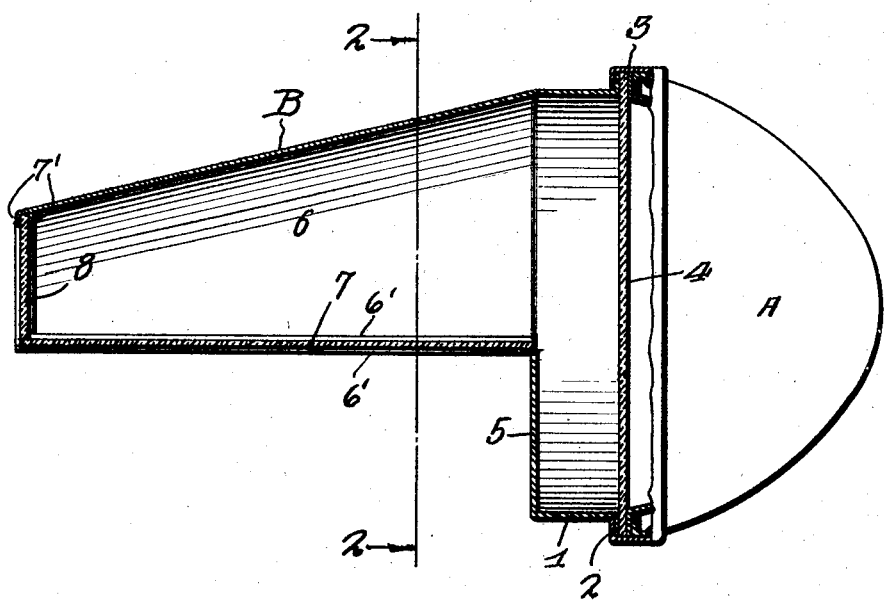
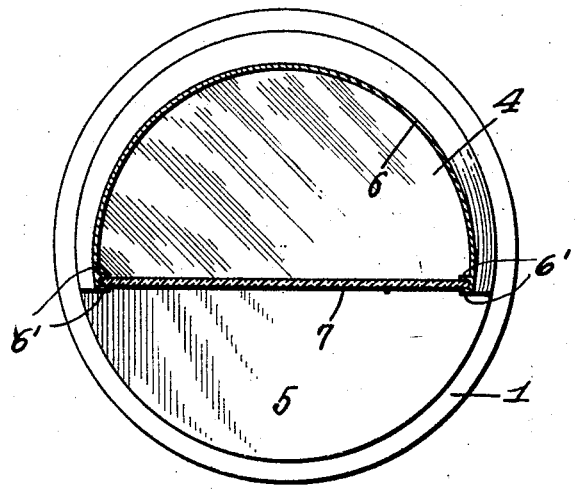
Fig. 2.
Rex F. Whittemore,
INVENTOR
BY Victor J. Evans
ATTORNEY June 30, 1931.  R. F. WHITTEMORE  1,811,988
HEADLIGHT
Filed July 23, 1928  2 Sheets-Sheet 2

Rex F. Whittemore,
INVENTOR
BY Victor J. Evans
ATTORNEY

Patented June 30, 1931

1,811,988

UNITED STATES PATENT OFFICE

REX F. WHITTEMORE, OF POMONA, CALIFORNIA

HEADLIGHT

Application filed July 23, 1928. Serial No. 294,726.

This invention relates to improvements in headlamps, the general object of the invention being to make the lower front part of the lamp opaque and to provide a visor for the upper front part having its bottom horizontally arranged and in the plane of the top of the opaque part, said bottom and the front of the visor being formed of transparent material, with the front part colored so that the rays of light passing through the front part of the visor will be colored, while those passing through the bottom part will be white, thus providing a lamp which will illuminate the road in front of the vehicle without blinding the drivers of other vehicles approaching the vehicle provided with the improved lamps, as the rays of light thrown directly ahead will be colored.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote corresponding parts throughout the several views, and in which:—

Figure 1 is a side view partly in section, showing the improvement applied to a headlamp.

Figure 2 is a section on line 2—2 of Figure 1.

Figure 3:
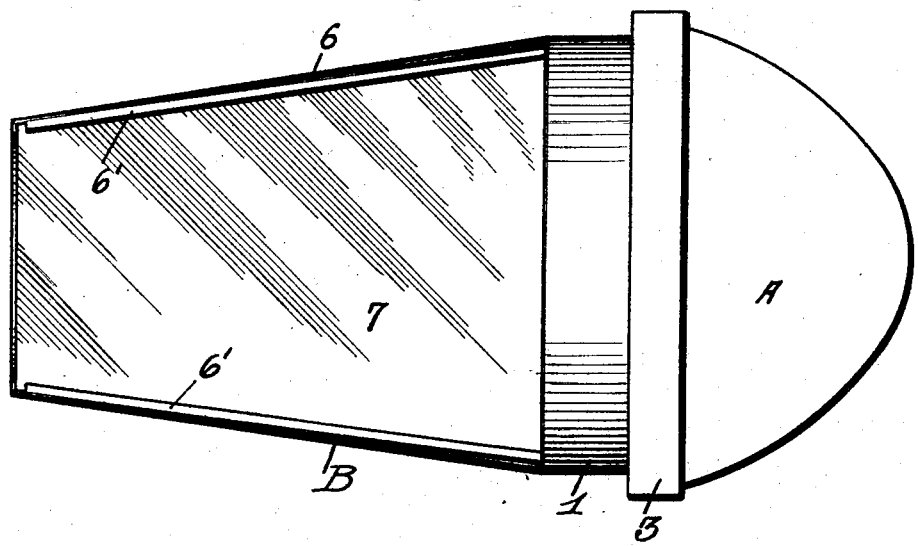
Figure 3 is a bottom plan view.
Figure 4:
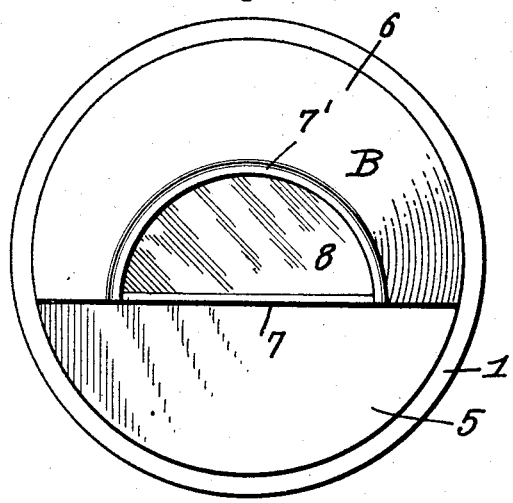
Figure 4 is a front view.

While the drawings show the invention as used as an attachment for a headlamp, it will, of course, be understood that the lamp can be formed integral with the device.

In these views, A indicates the headlamp and B the visor which is formed with the cylindrical rear part 1 having an annular flange 2 with which it may be attached to the lamp by a ring 3 which holds the lens 4 in the front of the lamp. The lower front portion of the part 1 has a semi-circular shaped front 5 of metal, with the upper edge formed integrally with the semi-conical part 6 which covers the opening left by the front 5. This part 6 tapers from its rear to its front and is provided with spaced longitudinally extending flanges 6' which receive a plate 7 of clear glass. The front end of the conical part 1 is provided with spaced arcuate shaped flanges 7' to receive a plate 8 of colored glass, and the latter is retained in the flanges 7' by resting on the plate 7. Thus it will be seen that the part 5 of part 1 prevents the rays of light from the lamp bulb escaping at this point and prevents the rays of light from blinding the drivers of approaching vehicles. The rays of light passing through the clear glass 7 illuminates the road in front of the vehicle without blinding the drivers of approaching vehicles and the rays of light passing through the colored lens 8 will be clearly seen by drivers of other vehicles without these rays being blinding or objectionable to the drivers.

From the foregoing it will be seen that I have provided a headlamp or attachment therefor which will produce proper illumination of the road without danger of blinding drivers of approaching vehicles.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

A visor for a headlight comprising a semi-conical portion and a cylindrical portion, the cylindrical portion having an annular flange formed on its rear edge for attachment to a headlight, an opaque semi-circular plate formed on the front edge of the cylindrical portion and closing the lower half of the latter, the semi-conical portion having its rear end formed on the front end of the front edge of the cylindrical portion and the upper edge of said plate, said elongated semi-conical member tapering from its rear end towards its front end, spaced horizontal flanges formed on the longitudinal edges of the semi-conical shaped member and terminating short of the forward end thereof, spaced arcuate shaped flanges formed on the forward end of the semi-conical shaped member, a colored glass closing the front end of the semi-conical shaped member and carried by the arcuate shaped flanges, and a clear glass carried by the horizontal flanges and underlying the colored glass to retain the latter in the arcuate shaped flanges and closing the under side of the semi-conical shaped member by extending from the colored glass to the plate.

In testimony whereof I affix my signature.

REX F. WHITTEMORE.